United States Patent Office 3,397,476
Patented Aug. 20, 1968

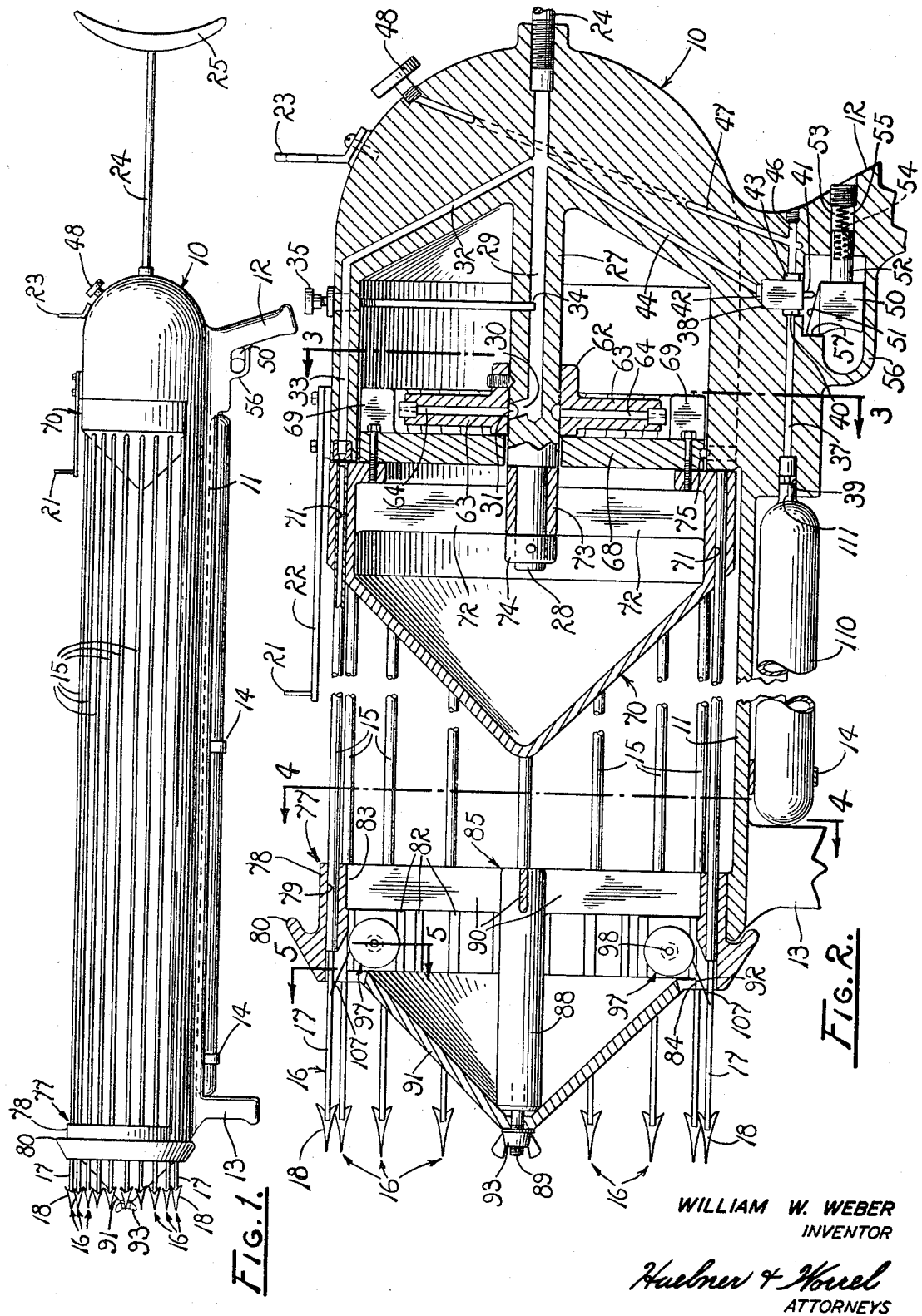

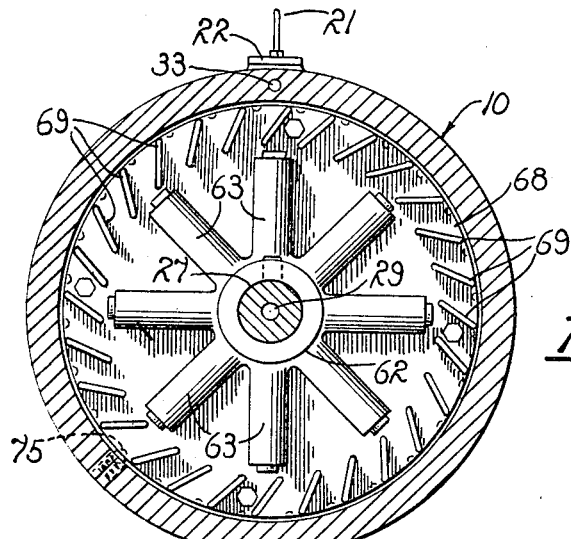
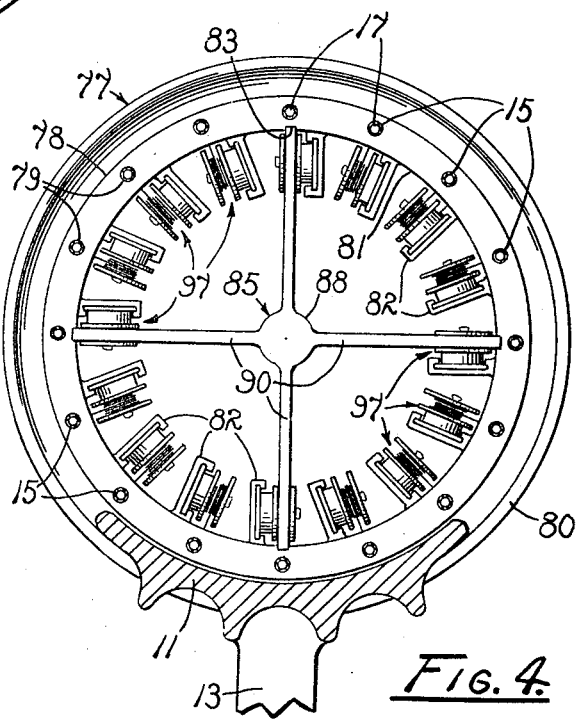
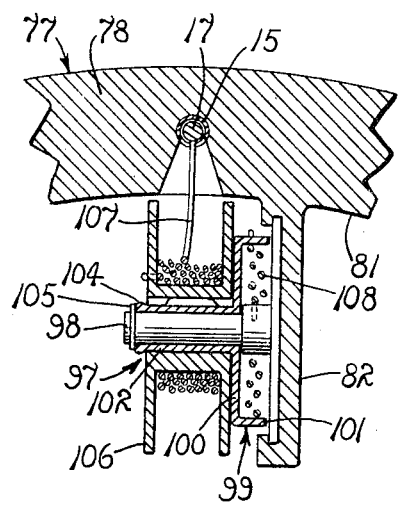

3,397,476
AUTOMATIC SPEAR GUN
William W. Weber, 608 E. 5th St.,
Madera, Calif. 93637
Filed Feb. 25, 1966, Ser. No. 530,006
5 Claims. (Cl. 43—6)

The present invention relates to an automatic spear gun powered with compressed gas and more specifically to an air actuated spear gun which mounts a plurality of spears which is capable of firing the spears either singly or in rapid succession.

Spear guns actuated by compressed air are widely used for underwater and surface fishing. Such guns are also gaining popularity for hunting birds and other game animals at close range. A major problem heretofore encountered in the use of air actuated spear guns is their lack of rapid fire capability since conventional spear guns are designed to fire one spear at a time. If the first shot misses, the target animal has ample time to escape before the gun can be reloaded. If the target animal is dangerous, a missed shot, together with the inability to reload quickly, can result in serious consequences. Furthermore, the single shot guns of the prior art require that additional spears be separately carried by the hunter. Usually the additional supply of spears is carried by hand which impairs manipulation of the gun. If the spears are transported in a quiver carried by the hunter, this frees the hunter's hands but a quiver is unwieldy, cumbersome and frequently inaccessible in an emergency.

Accordingly, it is an object of the present invention to provide an improved spear gun capable of receiving a plurality of spears at a time.

Another object is to provide an automatic spear gun.

Another object is to provide such an improved automatic spear gun adapted selectively to fire spears singly or in rapid succession.

Other objects and advantages will become more readily apparent upon reference to the following description in the specification and the accompanying drawings.

In the drawings:

FIG. 1 is a side elevation of a spear gun embodying the principles of the present invention.

FIG. 2 is a somewhat enlarged section through the spear gun of FIG. 1 taken along its longitudinal axis, foreshortened for illustrative convenience, and showing a rotatable spear cylinder.

FIG. 3 is a transverse section of the spear gun taken generally on line 3—3 of FIG. 2, and showing a drive mechanism for the spear cylinder.

FIG. 4 is a transverse section of the spear gun taken on line 4—4 of FIG. 2, showing a plurality of tether line reels individually associated with the spears.

FIG. 5 is a somewhat further enlarged fragmentary transverse section taken on line 5—5 of FIG. 2 through one of the tether line reels.

Referring more particularly to the structure shown in FIGS. 1 and 2, a tubular body 10 is provided of plastic or a lightweight metal. The body provides an integral extension or cradle 11 providing a rear pistol grip 12 and a forward grip 13. A plurality of clips 14 are mounted on the cradle.

A plurality of spear tubes 15 extend from, and are rotatably mounted about, the tubular body at its forward periphery and a plurality of spears 16 each having a shaft 17 and head 18 at one end, are individually held along the shafts in the spear tubes. A forward gun sight 21 is mounted on a plate 22 which is bolted to the tubular body and is aligned with a rear sight 23, also bolted to the tubular body. A rod 24 is mounted rearwardly of the tubular body and a shoulder rest 25 is attached to the rod at its extended end.

FIG. 2 shows a central shaft 27 extending axially into the tubular body 10 from the rearward end thereof and terminating in a stud 28. The shaft provides a gas conduit 29 having at its forward end a transverse exit port 30 leading to an annular groove 31 extending peripherally of the shaft. A gas conduit 32 leads from the conduit 29 at its rearward end to a firing tube 33. A needle valve 34 is positioned through the tubular body and adjustably extends into the conduit 29 and provides an adjusting head 35 to facilitate adjustment of the valve. The integral rib or extension 11 provides a gas conduit 37, having an enlarged intake opening 39, and which leads to a gas valve regulator 38 at its entry port 40, the regulator having an upwardly depressible actuating switch 41. The regulator provides gas exit ports 42 and 43 and a gas conduit 44 leads from the port 42 and connects to the conduit 29 at its junction with conduit 32. A short bleeder passage 46 connects from the port 43 to a bleeder conduit 47 which in turn connects to a pressure gauge 48.

Mounted on the pistol grip 12 is a trigger blade 50 providing an upper inclined surface 51 for contacting the switch 41 of the regulator 38. Attached to the trigger at its rear is a piston rod 52 which reciprocates within a chamber 53 in the pistol grip. The piston rod is provided with a recess 54 and a spring 55 is positioned in the recess and chamber to bias the piston rod and attached trigger forwardly. A trigger guard 56 integral with the extension 11 and pistol grip 12, slidingly receives the trigger. A shoulder stop 57 limits the forward movement of the trigger as it is biased along the trigger guard by the spring 55.

Bolted in circumscribing relation about the shaft 27 is a manifold 62 having a plurality of fingers 63 extending radially outwardly therefrom. The fingers each provide a bore 64 which communicates with the groove 31 of the shaft 27. Rotatably mounted about the shaft 27 and positioned adjacent to the manifold 62 is a driving ring 68. A plurality of vanes 69 are bolted rearwardly onto the driving ring and are angled to receive air discharged from the bores 64 of the fingers 63. Bolted to, and forwardly of, the driving ring 68 and rotatable about the shaft 27 is a first barrel 70. The barrel is conically shaped at its forward end and provides a plurality of elongate chambers 71 disposed about its periphery in parallel relation to the shaft which receive and constrain the rearward ends of the spear tubes 15. The barrel is reinforced by spokes 72 mounted on a collar 73 which rotates about the stud 28. A lock nut 74 secures the collar and driving ring against forward movement along the shaft 27. A spring located detent 75 is mounted on the body 10 and engages pockets 76 in the driving ring 68 located properly to align successive spear tubes 15 with the firing tube 33 when the spear tubes are indexed in increments of stepped progression.

A second barrel 77 is positioned at the forward end of the spear gun and includes a ring 78 having elongate chambers 79 which are axially aligned with the chambers 71 of the first barrel 70. The ring has an exterior flange 80 which partially wraps around the integral extension 11 at its forward end. The ring has a cylindrical inner surface 81 having a plurality of plates 82 radially inwardly extended therefrom.

A series of square indentations 83 are defined on the inner surface 81 at 90° intervals, and a peripheral groove 84 is provided forwardly of the ring on the inner surface. Rigidity is imported to the ring by a stiffening support 85 which includes a rod 88 axially aligned with shaft 27 and provided at its forward end wih a threaded stud 89. The rod has outwardly radiating spokes 90 mounted at its rearward end, the spokes being secured at their ends to the ring 78 by fitting into the indentations 83. A conical head 91 having a flattened outer edge 92 is mounted over the stud 89 with the edge 92 fitting into the groove 84 on the ring 78. A wing nut 93 is threaded onto the stud and compresses the edge 92 of the conical head into ring 78 thereby imparting rigidity to the stiffening support 85, ring 78 and barrel 77.

In order to retrieve a spear after it has been fired, a plurality of spring actuated tether line reels 97 are provided, a single reel being associated with each spear 16. Each reel includes an axle 98 mounted on the plate 82 and a spring guard 99, having a circular dish 100 bent at its outer end to form a cover 101. The dish at its central area defines a housing 102 for the axle. At its outer end the housing is expanded slightly to form a retaining ridge 104. The guard is secured against slippage along the axle by a washer 105. A spool 106 is rotatably mounted over the housing and a cord 107 is wound around the spool and attached at one end to its respective spear. A retractable spring 108 is wound around the axle between the guard and plate and is adapted to permit the cord to unwind from the spool when a spear attached to the cord is fired as the spring stores energy. When the forward motion of the spear has ceased, the spring is adapted to wind the cord up and reel in the spear. The provision of the reel is, of course, optional.

Energy for rotating the first and second barrels 70 and 78 holding the spear tubes 15 and spears 16, and energy for firing the spears is provided by compressed air or other suitable gas. A tank 110, having a constricted outlet neck 111, is provided to contain the compressed air and the tank is secured under the extension 11 by the clips 14. To provide an accommodating fit for the tank at its upper part, the extension 11 is shaped to conform to the tank. The outlet neck of the tank is securely inserted in air-tight engagement into the enlarged opening 39 of the conduit 37.

Operation

The operation of the described embodiment of the subject invention is believed to be clearly apparent and is briefly summarized at this point. To load the automatic spear gun, the shafts 17 of the spears 16 are inserted into the spear tubes 15. The outlet neck 111 of tank 110 is adjusted to release the air in the tank to conduit 37 and the driving ring 68 is manually rotated until a chamber 71 of the first barrel 70 is aligned with the firing tube 33.

The spear gun is aimed by viewing through the rear sight 23 and the forward sight 21. The spear gun is then fired by pulling the trigger 50. A positive force must be exerted to pull the trigger to overcome the forward biasing which spring 55 exerts against the piston rod 52 attached to the trigger. When the trigger is pulled, the trigger surface 51 is brought into contact with the actuating switch 41 of the regulator 38 causing the switch to be depressed upwardly after which the trigger is released and is biased forwardly. Actuation of the regulator permits a blast of compressed air to pass through the regulator and into the conduit 44 and bleeder line 46. The compressed air which passes along the conduit 44 branches into the conduits 29 and 32. After passing along the conduit 32, the compressed air then enters the firing tube 33 and projects the spear 16 forwardly out of the spear tube 15 and towards its target. The compressed air which has branched into the conduit 29 passes into the exit port 30 and groove 31 of the shaft 27 and divides into the bores 64 of the fingers 63. The compressed air is then projected out of the bores onto the vanes 69 bolted to the driving ring 68 thereby rotating the vanes, driving ring and first barrel 70 against the force of the friction roller 75. The pressure of the friction roller against the driving ring is adjusted to permit a succeeding chamber 71 in the barrel to be aligned with the firing tube. Consequently, by repeatedly pulling the trigger, an unfired chamber will be rotated into coincidence with the firing tube and a spear will be fired, the firing being continued until the supply of spears in the chambers is exhausted. If it is desired to fire the spears in rapid sequence rather than singly, the trigger is maintained depressed thereby causing the regulator to pass a series of compressed air pulses for firing the spears and rotating the barrels until the spears are exhausted.

When a spear has been fired, it unwinds the attached cord 107 from the spool 106, and when its forward motion has ceased, the spring 108 winds up the cord and reel in the spear. This occurs if the target has been missed, but if a hit has been made, the hunter is able to follow the cord to the point of impact, and capture the target or prey.

After a number of spears has been fired, the supply of compressed air in the tank 110 becomes exhausted. To indicate the pressure in the tank, the compressed air which has been passed from the regulator 38 into outlet port 43 and into the bleeder line 46, is transmitted along the conduit 47 and registers on the pressure gauge 48. When the gauge reads too low, the tank is replaced.

Consequently, the present invention provides an automatic spear gun capable of firing spears singly or in rapid sequence. Furthermore, the spear gun does not require an individual loading each time a spear is fired. This is of considerable benefit to the hunter who need no longer be concerned about being attacked by dangerous fish or animals since he can fire a salvo of spears and be assured of striking the target with at least one spear.

Additionally, the rapid fire capability of the spear gun permits a hunter to stalk his prey from a greater distance, since he can fire several spears quickly at the target and be reasonably assured of a hit.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A spear gun comprising a body having a firing tube; a source of compressed gas, the body having a conduit connecting the source of compressed gas to the firing tube; a trigger actuable regulator in the conduit for controlling the supply of compressed gas to the firing tube; holder means for spears, the holder means being rotatably mounted on the body and adapted upon predetermined increments of stepped progression succesively to communicate with the firing tube; and means carried by the body and connected to the conduit to direct compressed gas against, and thereby to rotate the holder, when the regulator is actuated.

2. An automatic spear gun comprising an elongate tubular body providing a firing tube; a source of compressed gas carried by the body, said body also providing a gas conduit connecting the source of compressed gas to the firing tube; a trigger actuable regulator mounted on the body in the conduit for triggering and controlling the amount of compressed gas supplied to the firing tube; a shaft carried by the body and extending centrally and axially thereof; a barrel rotatable about the shaft having a plurality of chambers each adapted to hold a spear and having rearward ends successively communicable with the firing tube upon rotation into coincidence therewith so that upon actuation of the regulator its spear is projected therefrom; a plurality of vanes mounted on the barrel; and means extending radially from the shaft to direct compressed air from the gas conduit against the vanes and thereby to rotate the barrel in response to actuation of the regulator.

3. The spear gun of claim 2 in which a reel is provided adjacent to each of said chambers, a cord is wound on each reel and has an end adapted for connection to a spear in its respective chamber, and resilient means is provided for each reel adapted to store energy as its respective spear is projected therefrom unwinding the cord and rotating the reel and reversely to rotate the reel and to rewind the cord to retract the spear after its forward motion has ceased.

4. An automatic spear gun comprising an elongate tubular body having a firing tube; a source of compressed gas carried by the body; the body having a conduit connecting the source of compressed gas to the firing tube; a trigger actuable regulator mounted on the body in the conduit for triggering and controlling the release of compressed gas to the firing tube; a shaft carried by the body and extending centrally and axially thereof providing a gas conduit connected to the regulator; means actuable by gas passing through said gas conduit for rotating said barrels in increments of stepped progression; a first barrel rotatable about the shaft providing a plurality of chambers radially spaced from the shaft and parallel to the shaft; and a second barrel rotatably mounted in the body in forwardly spaced relation to the first barrel providing a plurality of chambers individually aligned with the chambers of the first barrel; and spear tubes individual to each pair of aligned chambers having opposite ends disposed in their respective chambers and interconnecting the barrels in rigid assembly, said spear tubes being adapted individually to receive spears and having rearward ends adapted successively to register with the firing tube upon said rotation of the barrels in increments of stepped progression.

5. The spear gun of claim 4 in which said means comprises one of the barrels having vanes and said gas conduit means being directed toward the vanes whereby actuation of the regulator rotates the barrels to bring successive tubes into rotation with the firing tube.

References Cited
UNITED STATES PATENTS

| | | | |
|---|---|---|---|
| 1,478,597 | 12/1923 | Bebler | 124—11 |
| 2,147,003 | 2/1939 | Kozurik | 124—11 |
| 2,760,480 | 8/1956 | Carroll | 43—6 |
| 2,837,078 | 6/1958 | Daniel | 124—48 |
| 2,839,862 | 6/1958 | Hanshaw | 43—6 |
| 3,009,453 | 11/1961 | Ayala | 124—48 |

RICHARD C. PINKHAM, *Primary Examiner.*